(12) United States Patent
Longwell

(10) Patent No.: US 6,377,678 B1
(45) Date of Patent: Apr. 23, 2002

(54) TELEPHONE HANDSET EMULATOR

(75) Inventor: Thomas F. Longwell, Lincolnshire, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 09/538,580

(22) Filed: Mar. 29, 2000

Related U.S. Application Data

(60) Provisional application No. 60/127,312, filed on Apr. 1, 1999.

(51) Int. Cl.[7] .................. H04M 1/00; H04M 9/00; H04M 1/24; H04M 3/08; H04M 3/22
(52) U.S. Cl. ................... 379/387.01; 379/1.01
(58) Field of Search ............. 379/1, 27, 399, 379/419, 428, 387, 397

(56) References Cited

U.S. PATENT DOCUMENTS

| | | | |
|---|---|---|---|
| 3,684,832 A | 8/1972 | Marguth, Jr. ............. 179/2 DP |
| 4,893,331 A | 1/1990 | Horiuchi et al. ............. 379/93 |
| 5,058,155 A | 10/1991 | Larsen ..................... 379/442 |
| 5,185,789 A | 2/1993 | Hanon et al. ............... 379/395 |
| 5,239,579 A | 8/1993 | Schuh ......................... 379/395 |
| 5,396,551 A | 3/1995 | Lucey ......................... 379/395 |
| 5,623,544 A | * 4/1997 | Papadopoulos et al. ..... 379/413 |
| 5,729,603 A | 3/1998 | Huddart et al. ............. 379/387 |
| 5,825,873 A | 10/1998 | Duncan et al. ............. 379/419 |
| 5,832,076 A | 11/1998 | Holthaus et al. ........... 379/387 |
| 5,892,823 A | 4/1999 | Stelman ..................... 379/387 |
| 5,937,031 A | 8/1999 | Stelman ......................... 379/1 |
| 5,946,392 A | * 8/1999 | Tague ......................... 379/395 |
| 6,128,384 A | * 10/2000 | Papadopoulos et al. ..... 379/413 |

FOREIGN PATENT DOCUMENTS

| | | |
|---|---|---|
| WO | WO 97/36411 | 10/1997 |
| WO | WO 99/46912 | 9/1999 |

* cited by examiner

*Primary Examiner*—Binh Tieu
(74) *Attorney, Agent, or Firm*—Wallenstein & Wagner, Ltd.

(57) ABSTRACT

An interface device is provided for (1) automatically diagnosing the type and terminal connections of the earphone and microphone transducers used in any handset or headset and (2) automatically connecting any transducer set provided as a replacement handset or headset to emulate the original handset or headset. Subsequently, the user can connect, without further action, the replacement transducer set to the telephone base station.

12 Claims, 7 Drawing Sheets

ELECTRO-DYNAMIC EARPHONE
(TYPICAL R COIL = 32 Ohm)

ELECTRET 3-WIRE MICROPHONE
(TYPICAL RL = 22K Ohm,
GATE RESISTOR NOT SHOWN)

ELECTRET 2-WIRE MICROPHONE
(TYPICAL RL = 22K Ohm,
GATE RESISTOR NOT SHOWN)

ELECTRO-DYNAMIC MICROPHONE
(TYPICAL $R_{COIL}$ = 1000 Ohm)

CARBON MICROPHONE
(TYPICAL RL = 100 Ohm)

RJ009 JACK AND TERMINALS

2-WIRE ELECTRET-
CONFIGURATION A

RJ009
TERMINALS

2-WIRE ELECTRET
CONFIGURATION B

RJ009
TERMINALS

CONFIGURATION #1

RJ009 TERMINALS

CONFIGURATION #2

RJ009 TERMINALS

CONFIGURATION #3

RJ009 TERMINALS

CONFIGURATION #4

RJ009 TERMINALS

CONFIGURATION #5

RJ009 TERMINALS

CONFIGURATION #6

RJ009 TERMINALS

CONFIGURATION #7

RJ009 TERMINALS

CONFIGURATION #8

RJ009 TERMINALS

OVERVIEW OF DIAGNOSTIC ROUTINE

FIG. 11 FINDING EARPHONE TERMINAL PAIRS

IF 3-WIRE ELECTRET,
FINDING TERMINALS A, B, AND C

TELEPHONE HANDSET EMULATOR

RELATED APPLICATIONS

This application claims the benefit of U.S. Provisional Application No. 60/127,312 filed Apr. 1, 1999.

TECHNICAL FIELD

The present invention relates to telephone interface devices and, in particular, to interfaces designed to be inserted between a telephone input device and a telephone host system.

BACKGROUND OF THE INVENTION

British Patent Application No. 984905.9 describes a system for diagnosing the specific connections for the handset to the telephone base unit by considering the appearance of DC voltage and dial tone when the handset is in the off-hook condition. The diagnoses are performed automatically.

This diagnostic routine and a similar system described in WO 97/36411 depend on dial tones which vary in amplitude with transmission distance and which differ from country to country in frequency content and amplitude modulation patterns. Thus, no one dial tone detection scheme can be used to diagnose the earphone connection terminals. Another disadvantage is that the base unit must be connected to the host telephone system, which in turn must be connected to an active telephone host system, complicating the replacement of a handset.

SUMMARY OF THE INVENTION

In an embodiment the present invention includes an interface device that (1) automatically diagnoses the type and terminal connections of the earphone and microphone transducers used in any handset or headset and (2) automatically connects any transducer set provided as a replacement handset or headset to emulate the original handset or headset. Subsequently, the user can connect, without further action, the replacement transducer set to the telephone base station. By applying this invention, the user achieves comparable performance in sensitivity, output impedance, and current drain for DC line supervision as the original handset or headset but with the added convenience of upgraded performance provided by the new transducer set arrangement.

BRIEF DESCRIPTION OF THE DRAWINGS

In the accompanying drawings forming part of the specification, and in which like numerals are employed to designate like parts throughout the same.

BRIEF DESCRIPTION OF THE TABLES

Figure 1:
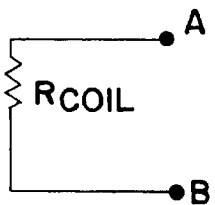
FIG. 1 is a schematic diagram of an electro-dynamic earphone.

Table 1 depicts earphone diagnostic conditions;

Table 2 depicts microphone diagnostic conditions;

Table 3 depicts possible terminal pairs and pairs with and without common terminals; and Table 4 depicts diagnostic routing flags.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
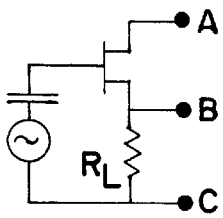
FIG. 2 is a simplified schematic diagram of an electret 3-wire microphone.
Figure 3:
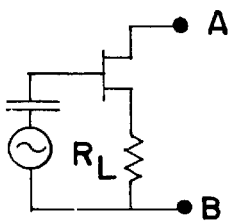
FIG. 3 is a simplified schematic diagram of an electret 2-wire microphone.
Figure 4:
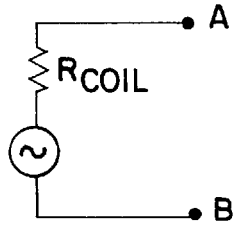
FIG. 4 is a schematic diagram of an electro-dynamic microphone.
Figure 5:
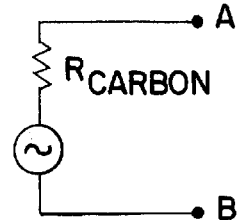
FIG. 5 is a schematic diagram of a carbon microphone.

Referring to figures, and as described in British Patent Application No. 984905.9, there are only five types of transducers that are appropriate for use in telephone systems. The electrical schematics representing these are shown here in FIG. 1: electro-dynamic earphone; FIG. 2: 3-wire electret microphone; FIG. 3: 2-wire electret microphone; FIG. 4: electro-dynamic microphone; and FIG. 5: carbon microphone. In the microphone figures, the electrical generator indicates the appearance of voltage generated by someone speaking into the microphone.

To simplify the diagrams in FIGS. 2 and 3, the gate bias resistor that is normally connected from gate to terminal C or from gate to source is not shown. Also in FIGS. 2 and 3, an FET is shown which could be either a JFET or a MOS FET. While these two types of FET's behave differently under some reverse bias conditions, this has been taken into account in the following disclosure.

In an embodiment of the invention, the diagnoses of the transducer type and terminal configurations are based on the differing current flow that results from applying a battery (and reversing its polarity) in the interface device to the terminals of the transducers in the original handset or headset. Tables 1 and 2 show the expected current flow for the various connections and for the typical transducers illustrated in FIGS. 1–5 when a 1.5 V battery is used. Other battery voltages could be used that would result in other expected current values but without changing the basis of the diagnostic routine or the invention. Furthermore, multiple batteries or power supplies could be used to implement battery conditions described herein without changing the basis of the diagnostic routine or the invention.

In Tables 1 and 2 and all of the following specification, the polarity convention is that the positive terminal of the battery is connected to the first of the two terminals listed. For example, the positive battery terminal is connected to transducer terminal A and the negative battery terminal is connected to transducer terminal B when a +1.5V battery is applied to A-B.

To simplify the description of the present invention, the specific means for detecting current is not shown, but those skilled in the art will appreciate the need to detect current values ranging from about 50 mA to less than 1 uA from the battery and to limit the current flow from the battery. This can be accomplished by conventional means and, in the description of the present invention, these current detection and/or limiting elements are considered to be part of the battery.

Figure 6:
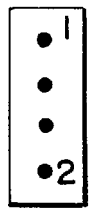
FIG. 6 is a top view of an RJ 009 jack.

FIG. 6 shows the four terminals, 1–4, found in an RJ009 jack typically used to connect the handset and telephone base station to a mating plug mounted on the interconnecting four wire cord. In an embodiment of the Telephone Handset Emulator interface device in accordance with the present invention, an RJ009 jack is mounted to accept the plug of the interconnecting four wire cord attached to the original handset. In some circumstances, an original headset or handset may not use an RJ009, but four terminals or four wires that can be referred to as 1–4 are still used and do not change the basis of the diagnostic routine or the invention.

The first column of Table 3 lists the possible terminal pairs that can be selected from the four that are available in the RJ009. Since a 3-Wire electret and an earphone with its two wires must share a common wire in a four wire cord, it is necessary to know the relationship of the possible terminal pairs. Thus, the next four columns on Table 3 list the pairs that share a terminal with one of the two terminals listed in the first column, and the last column lists the pair of terminals that do not share a common terminal with the pair in the first column.

Figure 10:
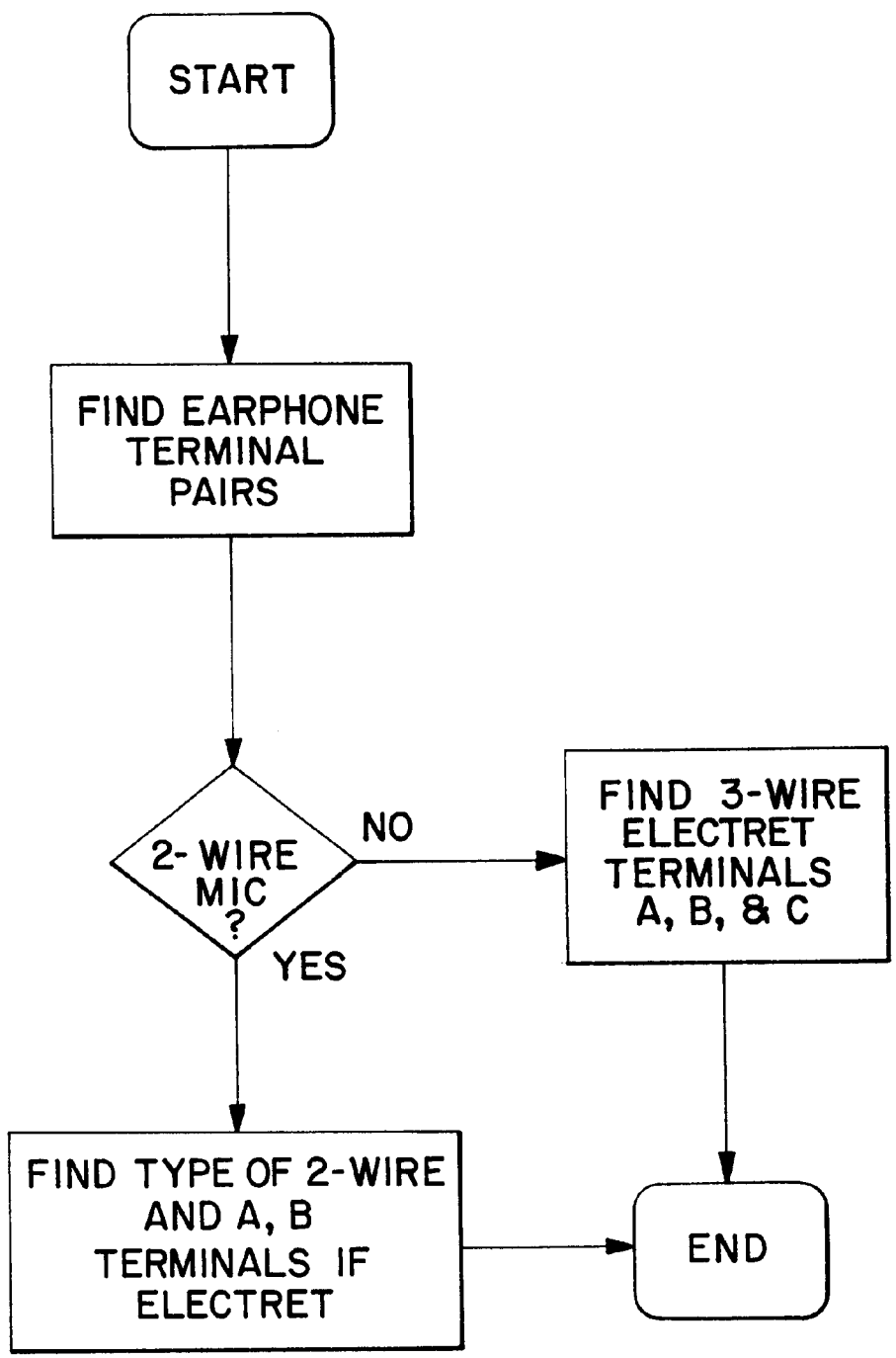
FIG. 10 is a flow chart providing an overview of a diagnostic routine in accordance with the present invention.

The overall diagnostic routine is shown in FIG. 10. Using a conventional 4×2 matrix switch, not shown, or other switching means, a battery (i.e., voltage potential) is applied to one of the possible pairs shown in Table 3 until the earphone terminals are found by detecting current flow that is greater than what a microphone would allow. Knowing these two earphone terminals and using the matrix switch, the battery (i.e., voltage potential) is applied to one of the terminal pairs with a common terminal as shown in column 2–5 of Table 3. Two results are possible:

A. If no battery current flows, it is now established that the microphone must use only two terminals as shown in the last column of Table 3. Using the matrix switch, battery is applied to these terminals. Based on the level of current flow, the type of microphone and its polarity (if it is a 2-wire electret) is determined.

B. If battery current flows, there is a terminal in common and a 3-wire electret microphone is used. Its A, B, and C terminals are found based on the level of current flow and the possible appearance of voltage at the earphone terminals.

Figure 11:
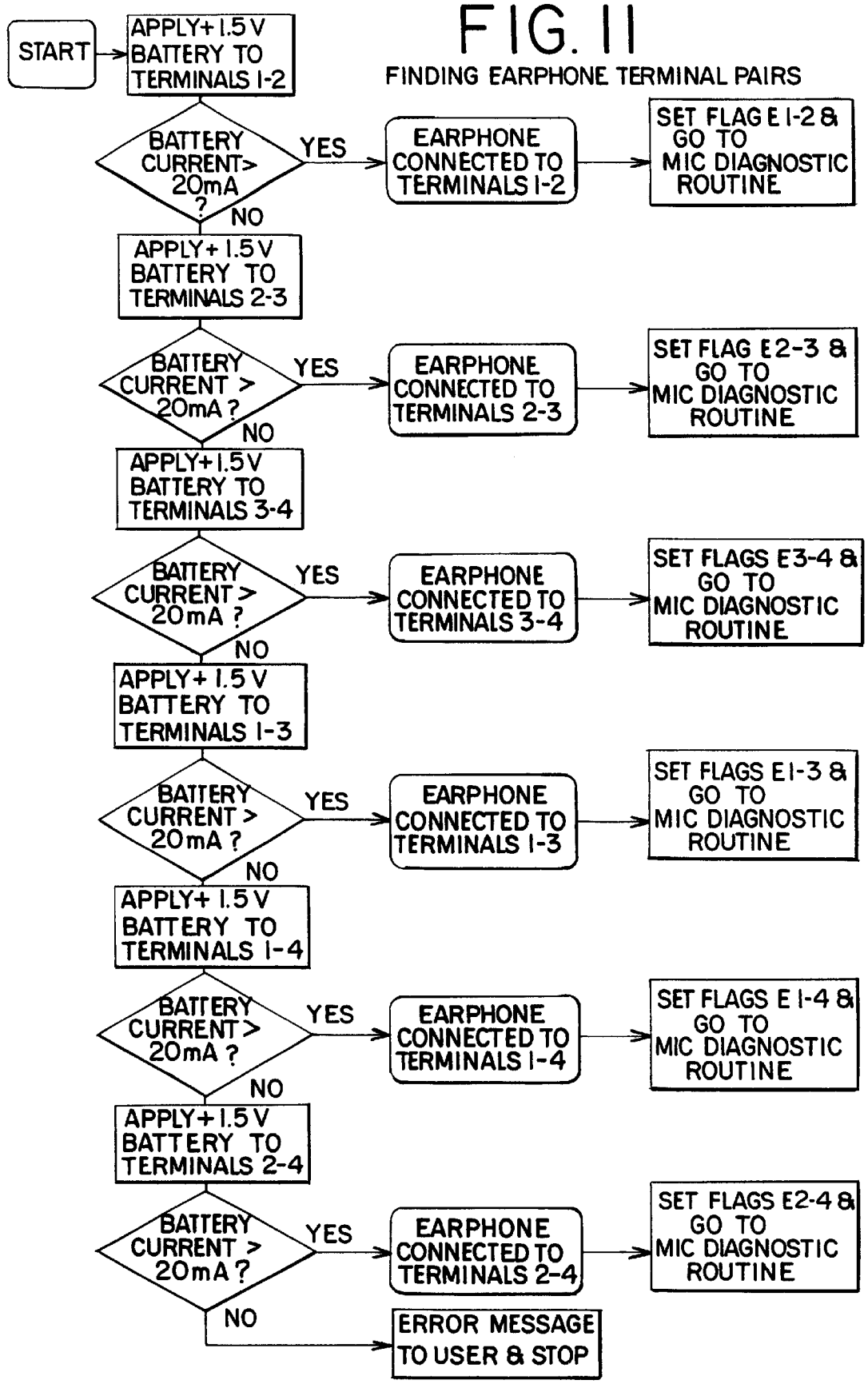
FIG. 11 is a flow chart for finding earphone terminal pairs in accordance with the present invention.

The following illustrates an embodiment of the detailed diagnostic routine for an example where the earphone is connected to terminals 2–3. (For those skilled in the art, alternate approaches and the use of computer subroutines to optimize the process can readily be identified.) In this example microprocessor flags shown in Table 4 are used to record the findings of the diagnostic routine for later use. FIG. 11 shows a decision tree flow diagram used to determine the earphone terminals and to set the corresponding earphone flag.

Figure 7:
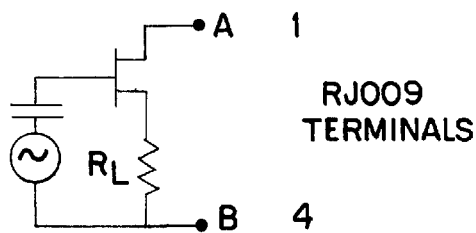
FIG. 7 is a schematic diagram of a 2-wire electret within an "A" configuration.
Figure 8:
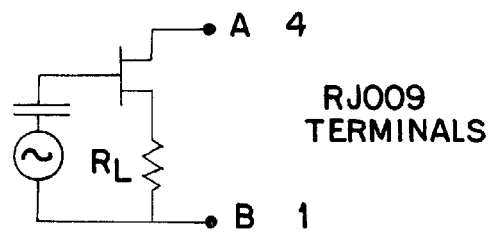
FIG. 8 is a schematic diagram Of a 2-wire electret within a "B" configuration.
Figure 9A:
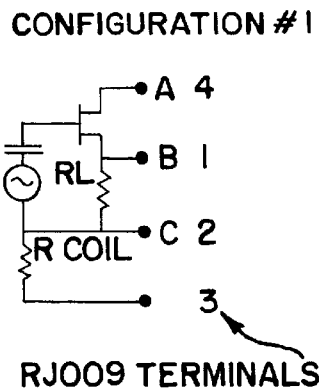
FIG. 9 provides eight configurations of a 3-wire electret.
Figure 9B:
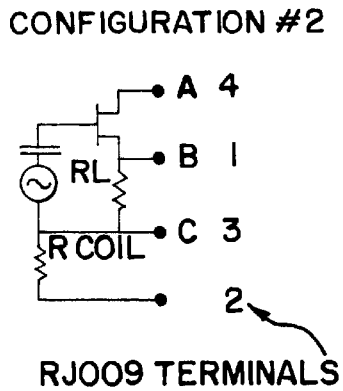
Figure 9C:
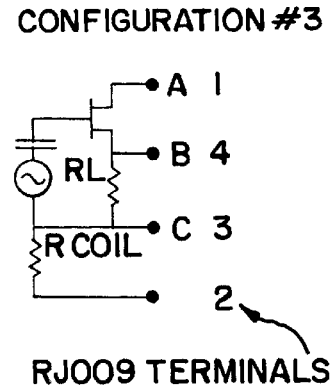
Figure 9D:
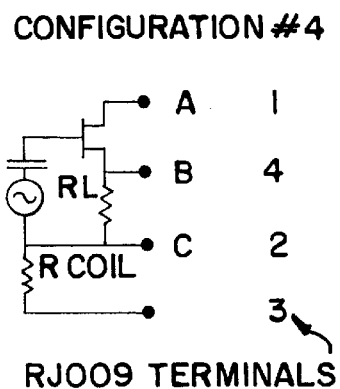
Figure 9E:
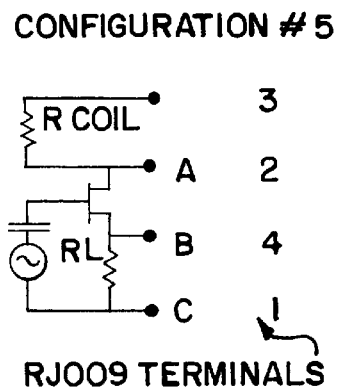
Figure 9F:
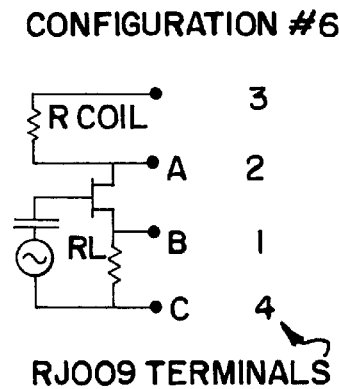
Figure 9G:
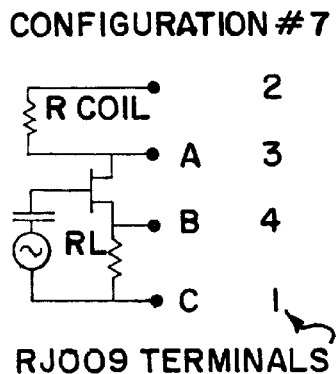
Figure 9H:
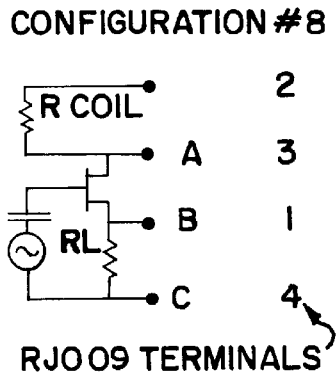
Figure 12:
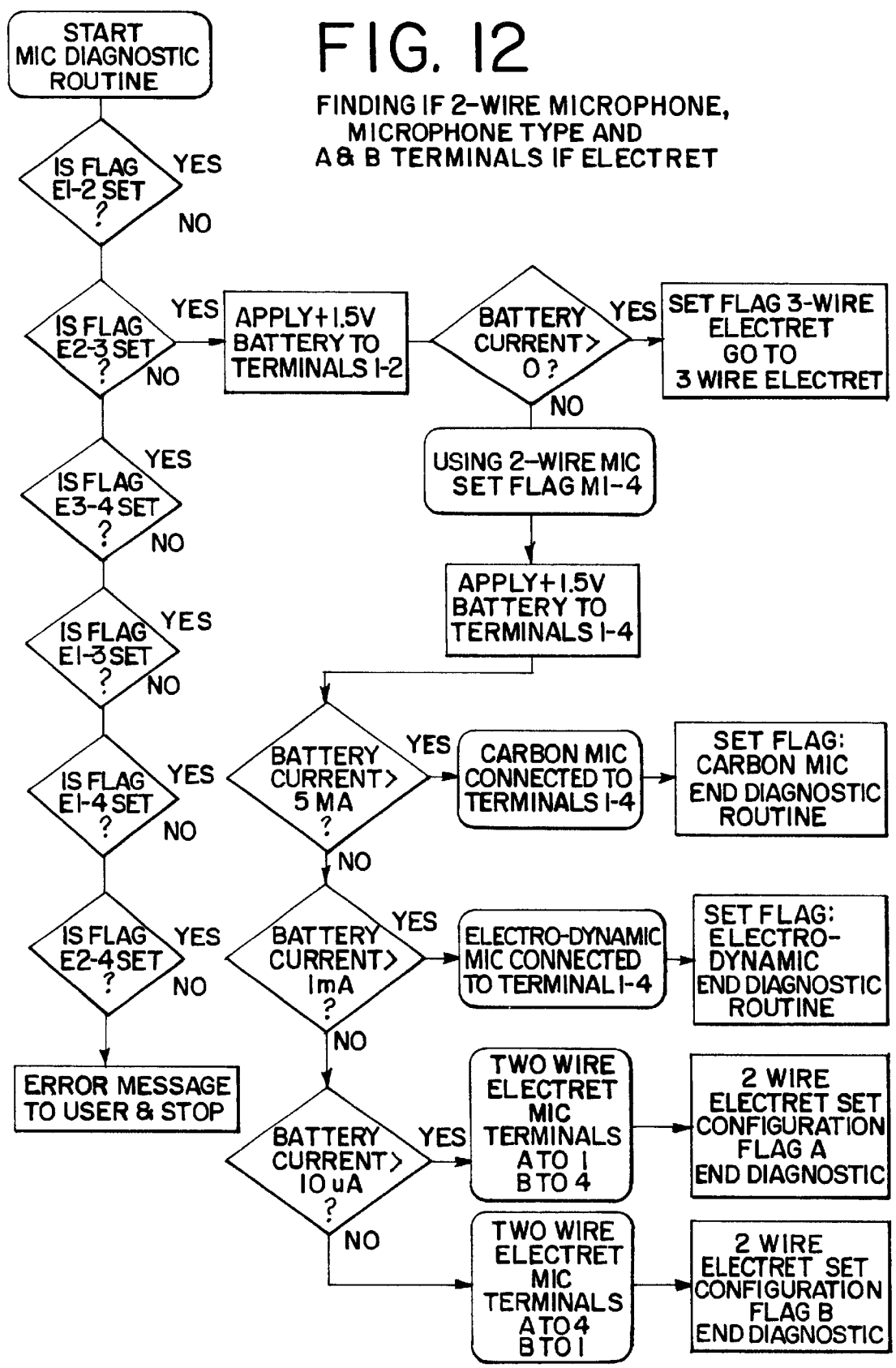
FIG. 12 is a flow chart in accordance with the present invention for determining if 2-wire microphone, microphone type and A & B terminal is electret.
Figure 13:
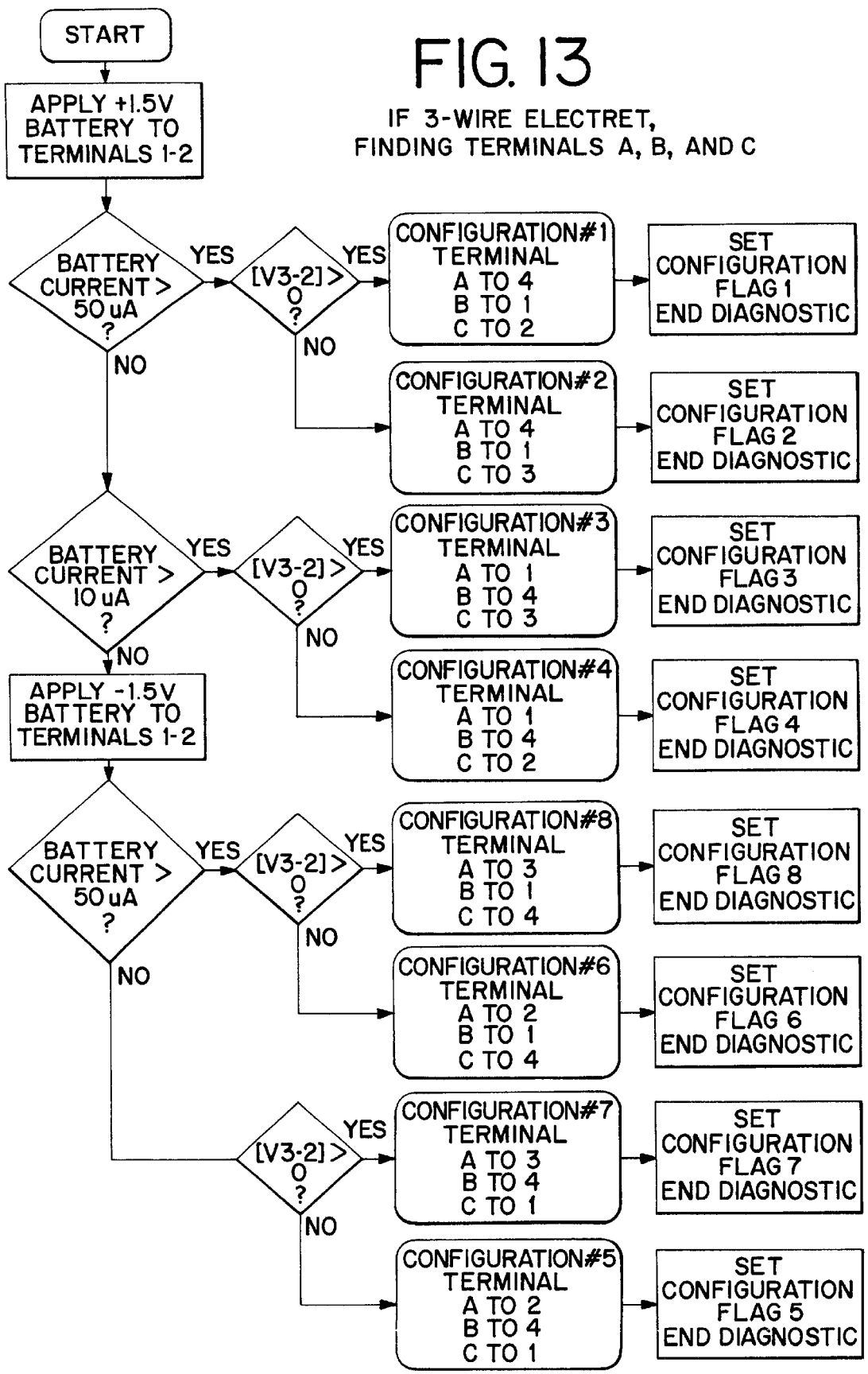
FIG. 13 is a flow chart in accordance with the present invention for, if 3-wire electret, finding terminals A, B, and C.

Next, the routine moves to the diagnosis of the microphone shown in FIG. 12. To simplify the example, each earphone flag is tested in turn until the one that is set is found thus triggering the corresponding microphone diagnostic routine. Again to keep it simple, only the routine that is based on an earphone connected to terminals 2–3 is shown. The current flow conditions considered in the routine can readily be determined from those shown in Table 2 and the two possible configurations shown in FIGS. 7 and 8. Subsequently, corresponding microphone flags are set in order to record the result. In the first test of current, if there is any current flow then one of the eight possible configurations shown in FIG. 9 for a 3-wire microphone requiring one terminal in common with the earphone is diagnosed next as shown in FIG. 13. Again, the current flow conditions considered in the routine of FIG. 13 can readily be determined from those shown in Table 2 and the configurations shown in FIG. 9. The earphone terminal that is in common with the 3-wire microphone is then found by detecting the presence or the absence of voltage across the its terminals due to current flow from the battery. Subsequently, corresponding microphone flags are set to record the result.

In an embodiment of the present invention, an AC signal source with 1.5 V peak amplitude is applied to the RJ009 terminal pairs and current flow conditions on each half cycle are detected with a diagnostic routine similar to that illustrated above.

In another embodiment, an AC signal source is applied via a matrix switch to the possible terminal pairs and an acoustic sound is generated by the earphone when it is connected to the AC source. A microphone connected with the interface box (possibly mounted within it) picks up the acoustic sound generating a microphone voltage that is detected when the AC signal source is connected to the earphone terminals. The diagnosis of the microphone connection is completed by either applying battery voltage as in the example or a 1.5 V peak AC voltage.

In yet another embodiment, the replacement transducer set and the original handset are both connected to the interface device but arranged by the user so that the earphone of the original handset is near the microphone of the replacement transducer set and vice versa. An AC signal source is applied to the possible earphone terminals in the original handset and the microphone of the replacement transducer set is used to detect the acoustic signal as in embodiment 2 until the earphone terminals are diagnosed. Then, the AC signal source is applied to the replacement transducer earphone to generate an acoustic sound. If a corresponding AC signal is found on a terminal pair of the original handset, the microphone type is electro-dynamic. If not, 1.5 battery is applied to possible terminal pairs, exclusive of the earphone pair. One skilled in the art can construct a diagnostic routine to determine whether a carbon, a 2-wire electret, or a 3-wire electret microphone is used and the related terminal connections.

While the specific embodiments have been illustrated and described, numerous modifications come to mind without significantly departing from the spirit of the invention and the scope of protection is only limited by the scope of the accompanying claims.

TABLE 1

Earphone Diagnostic Conditions

| Earphone Type | Terminals Connected to Battery | Current from +1.5 V Battery | Current from −1.5 V Battery |
| --- | --- | --- | --- |
| Electro-dynamic | A–B | 47 mA | 47 mA |

TABLE 2

Microphone Diagnostic Conditions

| Microphone Type | Terminals Connected to Battery | Current from +1.5V Battery | Current from −1.5V Battery |
|---|---|---|---|
| Electret 3-Wire | A–B | 50 uA < I < 200 uA | <1 uA |
|  | B–C | 68 uA | ≧68 uA |
|  | A–C | 10 uA < I < 50 uA | <1 uA |
| Electret 2-Wire | A–B | 10 uA < I < 50 uA | <1 uA |
| Electro-dynamic | A–B | 1.5 mA | 1.5 mA |
| Carbon | A–B | 15 mA | 15 mA |

TABLE 3

Possible Terminal Pairs and Pairs With and Without Common Terminals

| Possible Terminal Pairs | Pairs with Common Terminals | Pairs with Common Terminals | Pairs with Common Terminals | Pairs with Common Terminals | Pairs Without Common Terminals |
|---|---|---|---|---|---|
| 1–2 | 1–3 | 1–4 | 2–3 | 2–4 | 3–4 |
| 2–3 | 2–1 | 2–4 | 3–1 | 3–4 | 1–4 |
| 3–4 | 3–1 | 3–2 | 4–1 | 4–2 | 1–2 |
| 1–3 | 1–2 | 1–4 | 3–1 | 3–4 | 2–4 |
| 1–4 | 1–2 | 1–3 | 4–2 | 4–3 | 2–3 |
| 2–4 | 2–1 | 2–3 | 4–1 | 4–3 | 1–3 |

TABLE 4

| Category | Flag |
|---|---|
| Earphone Terminals | E1–2 |
|  | E2–3 |
|  | E3–4 |
|  | E1–3 |
|  | E1–4 |
|  | E2–4 |
| 2-Wire Microphone Terminals | M1–2 |
|  | M2–3 |
|  | M3–4 |
|  | M1–3 |
|  | M1–4 |
|  | M2–4 |
| Microphone Type | Carbon |
|  | Electro-dynamic |
|  | 2-Wire Electret |
|  | 3-Wire Electret |
| 2-Wire and 3-Wire Electret Configurations | A |
|  | B |
|  | 1 |
|  | 2 |
|  | 3 |
|  | 4 |
|  | 5 |
|  | 6 |
|  | 7 |
|  | 8 |

I claim:

1. A diagnostic method comprising the steps of:
   finding an earphone terminal pair;
   determining if the earphone terminal pair is a 2-wire microphone;
   finding 3-wire electret terminals if the earphone terminal pair is not a 2-wire microphone;
   finding terminals A and B and determining microphone type if the earphone terminal pair is a 2-wire microphone.

2. The method of claim 1 further comprising the step of applying a voltage potential to find the earphone terminal pair.

3. The method of claim 2 further comprising the step of applying a voltage potential to find the A and B terminals and to determine the microphone type.

4. The method of claim 3 further comprising the step of configuring a replacement handset to emulate an original telephone handset in response to finding the A and B terminals and determining the microphone type.

5. The method of claim 2 further comprising the step of applying a voltage potential to find the 3-wire electret terminals.

6. The method of claim 5 further comprising the step of configuring a replacement handset to emulate an original telephone handset in response to finding the 3-wire electret terminals.

7. A diagnostic circuit comprising:
   a circuit for finding an earphone terminal pair;
   a circuit for determining if the earphone terminal pair is a 2-wire microphone;
   a circuit for finding 3-wire electret terminals if the earphone terminal pair is not a 2-wire microphone;
   a circuit for finding terminals A and B and determining microphone type if the earphone terminal pair is a 2-wire microphone.

8. The circuit of claim 7 further comprising a circuit for applying a voltage potential to find the earphone terminal pair.

9. The circuit of claim 8 further comprising a circuit for applying a voltage potential to find the A and B terminals and to determine the microphone type.

10. The circuit of claim 9 further comprising a circuit for configuring a replacement handset to emulate an original telephone handset in response to finding the A and B terminals and determining the microphone type.

11. The circuit of claim 8 further comprising a circuit for applying a voltage potential to find the 3-wire electret terminals.

12. The circuit of claim 11 farther comprising a circuit for configuring a replacement handset to emulate an original telephone handset in response to finding the 3-wire electret terminals.

* * * * *

UNITED STATES PATENT AND TRADEMARK OFFICE
CERTIFICATE OF CORRECTION

PATENT NO.    : 6,377,678 B1
DATED         : April 23, 2002
INVENTOR(S)   : Thomas F. Longwell Page 1 of 1

It is certified that error appears in the above-identified patent and that said Letters Patent is hereby corrected as shown below:

Column 1,
Line 66, please delete "Of a" and insert therefor -- of a --.

Column 6,
Line 52, please delete "farther" and insert therefor -- further --.

Signed and Sealed this

Seventeenth Day of September, 2002

Attest:

Attesting Officer

JAMES E. ROGAN
Director of the United States Patent and Trademark Office